Aug. 27, 1935.  G. W. BAUGHMAN  2,012,738
BRAKE CONTROLLING DEVICE
Filed Nov. 17, 1934
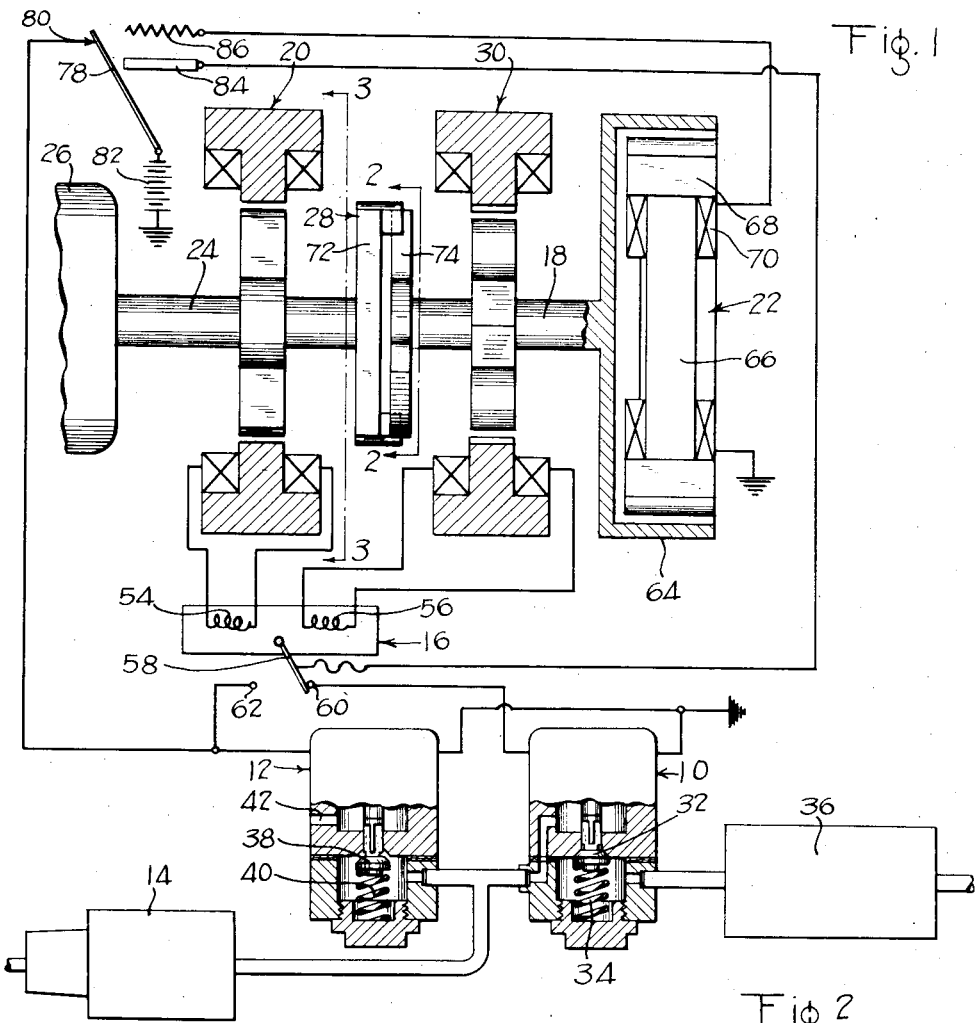
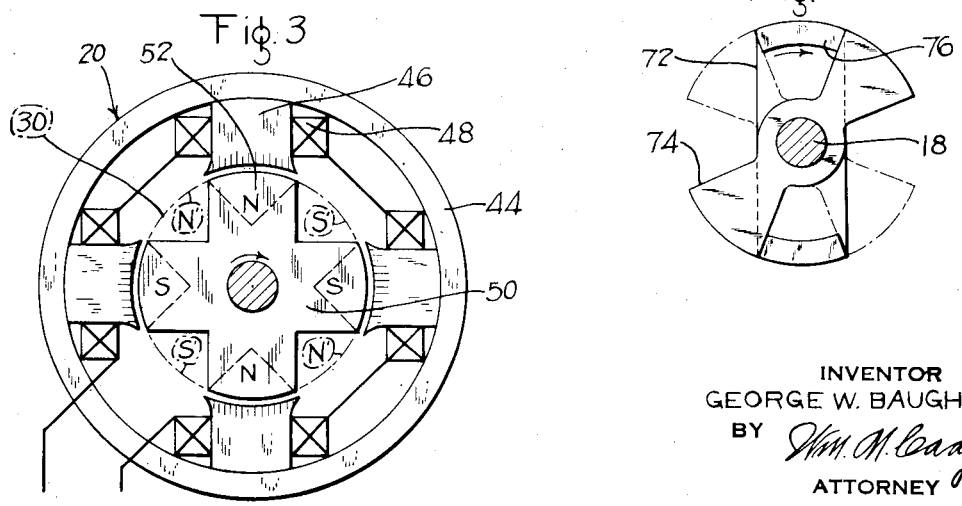
INVENTOR
GEORGE W. BAUGHMAN
BY *Wm. M. Cady*
ATTORNEY Patented Aug. 27, 1935

2,012,738

UNITED STATES PATENT OFFICE 2,012,738

BRAKE CONTROLLING DEVICE

George W. Baughman, Edgewood, Pa., assignor to The Westinghouse Air Brake Company, Wilmerding, Pa., a corporation of Pennsylvania Application November 17, 1934, Serial No. 753,469

8 Claims. (Cl. 303—21)

This invention relates to brake controlling devices, and more particularly to brake controlling devices in which the main vehicle brakes are controlled according to the characteristic of a pilot brake.

It is common knowledge in the vehicle brake art that the coefficient of friction between the rubbing parts of a friction brake increases as the speed of the vehicle with which the brake is associated diminishes. As a consequence, if the friction brake is applied with a high degree of braking force when the vehicle is traveling at relatively high speeds, then as the speed of the vehicle diminishes the braking force must be diminished, because the increasing coefficient of friction may increase the retarding force on the wheels to the point where sliding of the wheels will occur. Sliding wheels are objectionable in that the retarding force of the wheels diminishes when they slide, and also because flat places are worn on the wheels rendering them unfit for regular service.

In order to prevent sliding wheels on vehicles employing friction brakes, the braking force must be diminished by manual effort on the part of the operator, or some automatic means must be provided for the same purpose. It has heretofore been proposed to employ some form of device, commonly referred to as retardation controller devices, for diminishing the braking force in a manner such that a substantially constant rate of retardation is maintained. However, as the vehicle approaches a stop some manual effort on the part of the operator is required so as to bring the vehicle to a smooth stop without shock. It would therefore be highly desirable if some automatic means could be provided for controlling the friction brakes so as to produce a tapering off braking characteristic similar to that produced by an electrodynamic brake of the eddy current type.

In the eddy current type brake the braking effect produced is substantially constant over a fairly wide range at normal operating speeds, but as the speed of the vehicle diminishes toward a stop the braking effect also diminishes, so that when the vehicle is at rest the braking effect of the eddy current brake is zero. It would therefore be desirable if the friction brake could be controlled so as to produce a similar braking characteristic.

According to my invention, a principal object is to provide an auxiliary pilot brake in the form of an eddy current brake, and means for controlling the main vehicle brake so as to produce a braking characteristic corresponding to the braking characteristic of this pilot brake.

Yet further and more specific objects of the invention will be apparent from the following description, which is taken in connection with the attached drawing, wherein:

Figure 1 is a schematic and somewhat diagrammatic view of one form that the invention may take.

Figure 2 is a view along the line 2—2 of Figure 1, showing details of a coupling device employed.

Figure 3 is a view along the line 3—3 of Figure 1, showing in diagrammatic form details of the generators employed.

In the embodiment shown, I provide an application magnet valve device 10 and a release magnet valve device 12, for controlling the supply of fluid under pressure to and its release from a brake cylinder 14. A phase responsive relay 16 controls operation of the application and magnet release valve devices. The phase responsive relay 16 is connected to and operated according to the phase relation of voltages delivered by two generators 20 and 30.

The generator 30 is associated with a shaft 18 of an eddy current pilot brake device 22, while the generator 20 is associated with a shaft 24, which is either directly connected to a vehicle axle or may form an extension of the shaft of a vehicle drive motor 26. The two shafts 18 and 24 are in driving relation through a coupling device 28, which provides for limited relative movement between the two shafts.

Considering now these devices more in detail, the application magnet valve device 10 comprises a supply valve 32 urged toward a seated position by a spring 34, and toward an unseated position by action of an electromagnet in the upper part of the valve device casing, which when energized actuates the valve 32 downwardly. When the valve 32 is in unseated position, fluid under pressure may flow from a reservoir 36 to the brake cylinder 14, and when the valve 32 is in seated position, this flow is cut off.

The release magnet valve device 12 comprises a release valve 38, which is urged toward seated position by a spring 40, and toward unseated position by action of another electromagnet in the upper part of its casing, which when energized actuates the valve 38 downwardly. When the valve 38 is unseated, a communication is established between the brake cylinder 14 and the atmosphere, past the unseated valve 38, and through exhaust port 42. When the release valve 38 is in seated position, this communication with the atmosphere is cut off.

Each of the generators 20 and 30 comprises a stator member 44 having pole pieces 46 with windings 48 disposed thereon and suitably connected together. Each generator is also provided with a rotor member 50 of permanently magnetized steel having pole pieces 52 of alternating polarity, as indicated in Figure 3. When the rotor member 50 of each generator is rotated, there will be generated in the windings 48 of each an alternating voltage.

The windings 48 of the two generators 20 and 30 are connected, respectively, to coils 54 and 56 of the phase responsive relay 16. This relay may be one of the many types commonly employed in the railway signaling art and, as is well known, operates on the principle of a two phase induction motor. The relay is provided with a movable contact arm 58 which is adapted to be actuated into engagement with either of stationary contacts 60 and 62, according to the phase relation of voltages impressed upon the coils 54 and 56.

When the phase relation of the voltages impressed on the two coils 54 and 56 is such that the voltage impressed upon coil 54 leads in time relation the voltage impressed on the coil 56, the contact arm 58 will be in engagement with the stationary contact 60, and when the voltage impressed on coil 56 leads that impressed on coil 54, the contact arm will be in engagement with the stationary contact 62. When the two voltages are in phase, the contact arm 58 will assume a position intermediate the two stationary contacts.

The eddy current pilot brake device 22, comprises a rotor member 64 secured to or integral with the shaft 18, and preferably of sufficient mass to virtually form a fly wheel with respect to the mass of the other bodies associated therewith. This rotor member is preferably of cup-shaped design so that there may be rigidly mounted within a stator member 66 provided with pole pieces 68 and associated windings 70.

As is well known in connection with brake devices of this character, when the windings 70 are energized and the rotor member 64 is rotating, eddy currents will be induced in the rotor, and the reaction between these eddy currents and the magnet flux produced by the windings 70 produces a retarding or braking effect upon the rotor member. This braking effect may be made substantially constant for all high speeds, but when the speed decreases to a relatively low value the braking effect diminishes, at first slowly and then rapidly, becoming zero at zero speed.

The coupling device 28 comprises a member 72 secured to or integral with the shaft 24, and a second member 74 secured to or integral with the shaft 18. The member 72 is provided with axially extending lugs 76 which are adapted to engage or be engaged by the member 74, the parts being arranged so that for the arrangement shown provision is made for relative rotational movement between the two shafts 18 and 24 corresponding to 90 degrees of mechanical movement.

When the shaft 24 is driving the shaft 18, the coupling parts will have relative positions as indicated by the solid lines in Figure 2. For this condition, the rotor members 50 of the two generators 20 and 30 will have relative positions as shown by the solid and dot and dash lines in Figure 3. In this figure the rotor member of the generator 20 is indicated in solid lines, and, as will be seen, the pole pieces of this rotor member are directly adjacent the pole pieces of its stator member. The pole pieces of the rotor member of the generator 30 are indicated in dot and dash lines, and, as will be observed, are displaced from the rotor pole pieces of the generator 20 by 45 mechanical degrees.

For the particular arrangement shown, each generator comprises four poles, and the poles of the two stator members are in axial alignment, so that the 45 degrees mechanical displacement between rotor members corresponds to 90 degrees electrical displacement, that is, assuming the polarity relations as indicated in Figure 3, if the rotor members of the two generators are both rotated in a clockwise direction, then the voltage delivered by the generator 20 will lead in time relation the voltage delivered by the generator 30, by 90 electrical degrees.

When the shaft 24 is rotating at a speed lower than that at which the fly-wheel effect of rotor 64 tends to drive the shaft 18, the parts of the coupling device will be in the relative positions as indicated by the dotted lines of Figure 2, and the relative position of the rotors of the two generators will be the reverse of that indicated in Figure 3. Generator 30 will then produce a voltage leading the voltage of generator 20 by 90 electrical degrees. The purpose of this will now appear from a description of the operation of this embodiment.

The operation of the embodiment shown is as follows:

Applications of the brakes are controlled by manipulation of a manually operated control handle 78. When the vehicle is running, this handle is maintained in the release position shown in the drawing. In this position the handle is in engagement with a contact 80, thereby energizing the electromagnet of the release magnet valve device 12 from a source of current supply, as for example a battery 82. The release magnet valve device then holds its release valve 38 unseated, and the brake cylinder 14 is thus vented to the atmosphere.

When it is desired to effect an application of the brakes, the control handle 78 is rotated in a clockwise direction to a degree in accordance with the desired degree of braking. When the handle is thus rotated, it disengages from contact 80, to deenergize the release magnet valve device 12 to seat valve 38, and engages a contact 84 and remains in engagement therewith co-extensive with the movement of the handle. Engagement with this contact energizes the electromagnet of the application magnet valve device 10, through contacts 58 and 60 of the relay 16. The contacts 58 and 60 are maintained in engagement while the vehicle is running, because the voltage delivered to the coil 54 leads in phase relation the voltage delivered to the coil 56, due to the shaft 24, which is driven according to the vehicle speed, driving the shaft 18.

Energization of the electromagnet in the magnet valve device 10 causes unseating of supply valve 32, and fluid under pressure flows from the reservoir 36 to the brake cylinder 14, to apply the brakes. At the same time, handle 78 engages contacts of a resistance unit 86, to energize the windings 70 of the eddy current brake device 22, to a degree according to the resistance connected in the circuit. The resistance connected in the circuit depends of course upon the degree of movement of the handle 78, therefore, the braking effect produced on the rotor member 64 corresponds to the degree of movement of this handle.

With the eddy current brake device thus energized, the relation between the two shafts 18 and 24 is at first unchanged, because shaft 24 continues to drive shaft 18 as when the vehicle was running before the brakes were applied, and the braking effect on the rotor member 64 simply acts as an additional drag on the shaft 18.

Now as the pressure in the brake cylinder 14 builds up, the speed of the vehicle commences to diminish, and the rotational movement of shaft 24 likewise diminishes. The supply of fluid under pressure to the brake cylinder is unrestricted, so that a time will be reached when the shaft 24 begins to diminish in speed at a rate such that the relative positions of the coupling parts change from that shown in the solid lines of Figure 2 towards that shown in dotted lines. When this takes place, the relative positions of the generator rotor members likewise change from a position of lag for the rotor of generator 30 toward a position of coincidence of the rotors, and then toward a position of lead for the rotor of generator 30.

Now as soon as the rotors of the two generators approach or come into coincidence, the relay contact arm 58 disengages from the contact 60, and the electromagnet of the application magnet valve device is deenergized. The supply valve 32 then seats and the supply of fluid under pressure to the brake cylinder is cut off.

If now due to the increasing coefficient of friction between the rubbing parts of the friction brake, the shaft 24 tends to further diminish in speed relatively faster than the shaft 18, the rotor of generator 30 will move toward a leading position, and the voltage supplied to coil 56 will lead the voltage supplied to coil 54. When this takes place, contact arm 58 will engage contact 62, and the release magnet valve device 12 will be energized. The release valve 38 will then be unseated, and fluid under pressure will be released from the brake cylinder to the atmosphere.

This release of pressure from the brake cylinder will of course continue until the two shafts 18 and 24 are tending to diminish in speed at about the same rate. The contact arm 58 will then assume some position intermediate the two contacts 60 and 62 and the supply to the brake cylinder will then be lapped.

It will thus be obvious, that the increasing coefficient of friction between the brake parts will again cause shaft 24 to tend to diminish in speed at a rate greater than shaft 18, and a subsequent release of pressure from the brake cylinder will be effected by the relay 16. This release of pressure will then take place whenever the shaft 24 tends to diminish in speed faster than shaft 18.

Now since the shaft 18 tends to diminish in speed according to the braking characteristic of the eddy current brake device 22, it follows that the relay 16 will be operated to so control the pressure in the brake cylinder as to produce a braking characteristic corresponding to the braking characteristic of the eddy current brake device. As the vehicle approaches a stop then, the braking force of the friction brake will be tapered off according to the taper off of the eddy current brake and the vehicle will be brought to a smooth stop.

When the operator desires to effect a release of the brakes, the handle 78 is moved to the release position shown in the drawing, in which position the brake cylinder is vented to the atmosphere and the vehicle brakes thus released.

Since the degree of energization of the eddy current brake device depends upon the position of the handle 78, it will be obvious that any degree of braking may be obtained by movement of the handle 78, but that the braking characteristic resulting will always be in accordance with the braking characteristic of the eddy current brake device.

In the embodiment illustrated, four pole generators have been shown, and the relative motion between the shafts 18 and 24 has been made to accord with this polar arrangement. It will be apparent however that any other number of poles may be employed and provision made for a corresponding relative movement between the two shafts 18 and 24.

While I have described my invention with particular reference to one embodiment, it is to be understood that I do not wish to be limited to this specific embodiment or otherwise than by the scope and spirit of the appended claims.

Having now described my invention, what I claim as new and desire to secure by Letters Patent, is:

1. In a vehicle brake system, in combination, two rotatable bodies, an eddy current brake device for producing a braking effect on one of said bodies, fluid pressure brake means for producing a braking effect on the other of said bodies, electromagnetic means for producing electrical effects related to the braking effect on each of said bodies, and means responsive to differences in said electrical effects for controlling said fluid pressure brake means to produce a braking effect corresponding to the braking effect of said eddy current brake device.

2. In a vehicle brake system, the combination with a brake cylinder, of supply and release valve means for controlling the supply of fluid under pressure to and its release from said brake cylinder, a phase responsive relay for controlling operation of said valve means, two alternating current generators adapted to be operated according to the speed of the vehicle, means providing for relative rotational movement between the rotating members of each of said generators, an eddy current brake device for producing a braking effect on the rotating member of one of said generators, and means for supplying voltages from said generators to said relay differing in phase according to the relative movement between the rotating members of said generators.

3. In a vehicle brake system, the combination with a brake cylinder, of two shafts, means coupling said shafts and providing for limited rotational movement therebetween, an alternating current generator on each of said shafts, said generators being adapted to produce voltages having a relative phase relation corresponding to the degree of relative movement between said shafts, an eddy current braking device for producing a braking effect on one of said shafts, means whereby the other of said shafts is braked according to the supply of fluid under pressure to said brake cylinder, and means operated according to the phase relation of said voltages for controlling the supply of fluid under pressure to and its release from said brake cylinder to produce a braking effect on said second shaft corresponding to the braking effect on said first shaft.

4. In a vehicle brake system, the combination with a brake cylinder, of two shafts adapted to be rotated according to the speed of the vehicle, coupling means coupling said shafts and providing for a limited degree of rotational movement therebetween, an alternating current generator associated with each of said shafts, said generators being adapted to produce alternating voltages having a relative phase relation corresponding to the relative positions of said shafts, a phase responsive relay adapted to be operated according to the relative phase relation of said voltages, an eddy current brake device for producing a braking effect on one of said shafts, and means controlled by said relay for controlling the supply of fluid under pressure to said brake cylinder to produce a braking effect on said vehicle corresponding to the braking effect produced by said eddy current brake device on said one shaft.

5. In a vehicle brake system, the combination with a brake cylinder, of two shafts adapted to be rotated at a speed corresponding to the speed of the vehicle, coupling means coupling said shafts and providing for a limited degree of relative rotational movement between said shafts, an alternating current generator associated with each of said shafts, each of said generators having a multi-polar rotor member, the relative movement between said shafts providing for the rotation of the poles of one of said rotor members in advance of or behind the poles of the other of said rotor members according as one of said shafts tends to rotate at a greater or lesser speed than the other, the voltage produced by one generator bearing a phase relation to the voltage produced by the other generator according to the relative positions of the pole pieces of the rotor members, an eddy current brake device for producing a braking effect on one of said shafts, a phase responsive relay operated according to the phase relation of said voltages, and means controlled by said relay for controlling the supply of fluid under pressure to and its release from said brake cylinder, whereby the braking effect produced on said vehicle is caused to correspond at all times to the braking effect produced by said eddy current brake device.

6. In a vehicle brake system, in combination, a brake cylinder, two shafts adapted to be rotated according to the speed of the vehicle, an alternating current generator on each of said shafts, each of said generators having a rotor with like pole members, means providing for a limited relative rotational movement between said shafts, whereby the pole pieces of said rotors may have relative positions of lead and lag, means for effecting a supply of fluid under pressure to said brake cylinder, means rendered operable when the rotor of one generator leads the rotor of the other generator for cutting off said supply, and means rendered operable when said first rotor lags said second rotor for effecting a release of fluid pressure from said brake cylinder.

7. In a vehicle brake system, in combination, a brake cylinder, electroresponsive means for controlling the supply of fluid under pressure to and its release from said brake cylinder, two shafts adapted to be rotated at a speed corresponding to the speed of the vehicle, a coupling device coupling said shafts and providing for a limited degree of rotational movement therebetween, an alternating current generator associated with one of said shafts, and a second alternating current generator associated with the other of said shafts, said coupling device providing for relative positions between the rotor members of said generators whereby when one shaft tends to rotate at a lower speed than the other shaft the voltages produced by said generators are out of phase, a brake device for producing a braking effect on one of said shafts, a control device operable to effect operation of said electroresponsive means to effect a supply of fluid under pressure to said brake cylinder and operable to effect operation of said brake device to a degree according to the movement of said control device, and means governed by the relative phase relation of the voltages delivered by said generators for controlling said electroresponsive means to produce a braking effect on the vehicle corresponding to the braking effect produced by said brake device.

8. In a vehicle brake system, in combination, a brake cylinder, an application magnet valve device for controlling the supply of fluid under pressure to said brake cylinder, a release magnet valve device for controlling the release of fluid under pressure from said brake cylinder, a normally closed circuit for energizing said release magnet valve device to vent said brake cylinder to the atmosphere, an eddy current brake device, a control device operable to open said circuit and to establish a second circuit for energizing said application magnet valve device, a relay controlling said second circuit and operable to reenergize said release magnet valve device, resistance means for effecting energization of said eddy current brake device according to movement of said control device, means operated according to the speed of the vehicle, a second means also operated according to the speed of the vehicle but adapted to be retarded in speed by said eddy current brake device, and means controlling said relay to cause operation thereof according to differences in operation of said last two means.

GEORGE W. BAUGHMAN.